United States Patent [19]

Matsuda

[11] 3,966,134

[45] June 29, 1976

[54] CASSETTE FOR AN ENDLESS TYPE CINEFILM

[75] Inventor: Yasuhisa Matsuda, Mitaka, Japan

[73] Assignee: Copal Company Limited, Tokyo, Japan

[22] Filed: Dec. 3, 1973

[21] Appl. No.: 421,101

[30] Foreign Application Priority Data
Dec. 11, 1972  Japan.......................... 47-142218[U]

[52] U.S. Cl............................ 242/55.19 A; 352/128
[51] Int. Cl.² ........................................... B65H 17/48
[58] Field of Search............. 242/55.19 A, 55.19 R, 242/55.21; 352/78, 72, 128

[56] References Cited
UNITED STATES PATENTS

| | | | |
|---|---|---|---|
| 2,327,108 | 8/1943 | Heyer | 242/55.19 A |
| 3,289,964 | 12/1966 | Vito | 242/55.19 A |
| 3,697,009 | 10/1972 | Zahradnik | 242/55.19 R |
| 3,726,457 | 4/1973 | Staar | 242/55.19 A |

FOREIGN PATENTS OR APPLICATIONS

| | | | |
|---|---|---|---|
| 293,730 | 12/1953 | Switzerland | 242/55.19 A |

*Primary Examiner*—Peter Feldman
*Assistant Examiner*—John M. Jillions
*Attorney, Agent, or Firm*—Otto John Munz

[57] ABSTRACT

Cassette for an endless type cinefilm comprises a casing containing therein the film coiled to form windings thereof supported and guided between outer and inner guide rings. The casing has a film gate across which a portion of the film pulled out of the innermost winding of the windings of the film through the outlet cut-out portion of the inner guide ring is moved for the projection or the exposure of the film. After having moved across the film gate, the film is advanced into the inlet cut-out portion of the outer guide ring to merge into the outermost winding of the windings of the film. The casing is provided with an arcuate guide member for the film located outside of the outer guide ring at a position remote from the cut-out outlet portion of the inner guide ring through which the portion of the film is pulled out from the innermost winding of the film. The arcuate guide member is arranged obliquely with respect to the direction of movement of the portion of the film moved from the outlet cut-out portion to the arcuate guide member so that the portion of the film is twisted by 90° so as to maintain the plane of that portion of the film closely adjacent to the upper end face of the windings of the film normal to the axis thereof while the portion of the film after having been guided by the guide member is twisted by 180° while changing the direction of movement thereof so that the plane of that portion of the film after having been guided by the guide member is held closely adjacent to and parallel to the plane of the opposite lower end face of the windings of the film and in a plane lying within the width of the film forming the windings normal to the axis of the windings thereby permitting the internal dimension of the casing in the axial direction of the windings to be made only nominally greater than the width plus the thickness of the film rendering the thickness of the casing to be made to the minimum.

5 Claims, 3 Drawing Figures

CASSETTE FOR AN ENDLESS TYPE CINEFILM

BACKGROUND OF THE INVENTION

The present invention relates to a cassette for an endless type cinefilm in the form of coiled windings thereof adapted to be used with a projector or a cinecamera in which the thickness of the cassette is made to the minimum with the inside dimension thereof axially of the windings of the film reduced substantially equal to the width of the film plus the thickness thereof so that the manipulation and storage of the cassette are made convenient.

Heretofore, in a prior art cassette for an endless type cinefilm as described above, the windings of the film are located in the lower half or the bottom side of the cassette and the portion of the film pulled out of the innermost winding of the film and merging into the outermost winding thereof is shifted axially of the windings of the film so as to be brought into the upper half or the upper side of the cassette so that the portion of the film thus shifted axially of the windings of the film is advanced across the film gate of the cassette for the projection or the exposure of the film effected by a projector or a cinecamera in which the cassette is loaded, thereby requiring the internal dimension of the cassette axially of the windings of the film housed in the cassette to be made about twice as large as the width of the film. Thus, the cassette is made bulky, so that the manipulation and the storage of the cassette are made inconvenient.

SUMMARY OF THE INVENTION

The object of the present invention is to eliminate the above described disadvantages of the prior art cassette and to provide a novel and useful cassette in which the thickness of the cassette axially of the windings of the film housed therein is made to the minimum for convenience of the manipulation and storage thereof.

The above object is achieved in accordance with the present invention by providing a cassette for an endless type cinefilm having a casing for housing therein a cinefilm coiled to form windings thereof, the casing having a film gate for the projection or the exposure of the portion of the film fed out of the windings and guided to pass across the film gate during the intermittent feeding of the portion of the film when the cassette is loaded in a projector or a cinecamera for use therewith and actuated thereby. Annular inner and outer guide rings coaxially arranged in the casing are spaced a distance from each other for supporting and guiding the windings of the film therebetween. The inner guide ring has an outlet cut-out portion for feeding the terminal portion of the innermost winding of the film inwardly through the outlet cut-out portion for moving the thus fed out portion of the film toward and across the film gate. The outer guide ring is formed with an inlet cut-out portion for receiving the portion of the film which has been moved across the film gate into the outer guide ring so as to merge into the outermost winding of the film in the outer guide ring. The cassette is characterized by the provision of guide means for guiding the portion of the film fed out of the outlet cut-out portion of the inner guide ring across the inner and outer guide rings, at portions remote from the outlet cut-out portion, so as to twist the portion of the film thus fed out by 90° to maintain the plane of that portion of the film closely adjacent to the upper end surface of the windings of the film while the portion of the film normal to the axis thereof after having been guided over the guide means is twisted by 180°. The direction of movement of the film is such as will maintain the film in within the plane of the opposite lower end surface of the windings of the film, thereby permitting the inside dimension of the casing axially of the windings of the film to be reduced to that of substantially equal to the width of the film plus the thickness of the film.

In accordance with one feature of the present invention, when embodied in a cassette having its film gate in one of the side walls of the cassette oriented in parallel to the axis of the windings of the film, the guide means is made in the form of an arcuate guide member supported at a portion of the casing exteriorly of the outer guide ring adjacent to the position at which the portion of the film fed out of the inner guide ring moves across the inner and outer guide rings. The outer arcuate surface of the arcuate guide member is oriented obliquely with respect to the direction of movement of that portion of the film so as to twist the portion of the film guided over the outer arcuate surface by 180° in the same direction as the prior twisting of 90° for maintaining the plane of that portion of the film closely adjacent to the upper axial end surface of the windings of the film. The direction of movement of the portion of the film traversing the arcuate guide member is turned substantially at a right angle so that the portion of the film after having been guided over the arcuate guide member is held in the plane of the opposite lower axial end surface of the windings of the film. A further guide member is provided for guiding the portion of the film thus twisted by 180° so as to additionally twist the portion of the film by 90° in the same direction as the twisting of 180° effected by the arcuate guide member thereby permitting the portion of the film fed out of the inner guide ring to be moved across the film gate and advanced to the inlet cut-out portion so as to merge into the outermost winding of the film after that portion of the film has been twisted by the total resultant twisting angle of 360°.

Further, the arcuate guide member may be made in the form of a guide roller rotatably supported by a shaft secured in the casing.

In accordance with another feature of the present invention, when embodied in a cassette having its film gate formed in one of the upper and lower walls of the casing oriented perpendicular to the axis of the windings of the film, the guide means may be made in the form of an arcuate guide member supported at a portion of the casing exteriorly of the outer guide ring adjacent to the portion at which that portion of the film fed out of the inner guide ring moves across the inner and outer guide rings. The outer arcuate surface of the arcuate guide member is oriented obliquely with respect to the direction of movement of the portion of the film across the inner and outer guide rings so as to twist the portion of the film guided over the outer arcuate surface of the arcuate guide member by 180° in the same direction as the prior twisting of 90° for maintaining the plane of that portion of the film closely adjacent to the axial end surface of the windings of the film. The direction of movement of the portion of the film is simultaneously turned at an angle so as to to advance the twisted portion of the film gate with that portion of the film in the area of the filmgate being held in the plane of the lower end surface of the windings of the film. A further guide member is provided at a position at which that portion of the film which has been moved across the film gate is guided by the further guide member to twist by 180° in the direction opposite to the twisting by 180° effected by the arcuate guide member. The direction of movement of that portion of the film guided by the further guide member is turned so as to be advanced toward the inlet cut-out portion of the outer guide ring to merge into the outermost winding of the film. The portion of the film after guided by the further guide member is twisted by 90° before reaching the inlet cut-out portion of the outer guide ring in the direction opposite to the twisting of 90° for maintaining the plane of the portion of the film fed out of the inner guide ring closely adjacent to the axial end surface of the windings of the film, thereby permitting the portion of the film fed out of the inner guide ring to be received in the inlet cut-out portion after having passed across the film gate without being subjected to any resultant twisting of the film.

In this case, the arcuate guide member may also be made in the form of a guide roller rotatably supported by a shaft in the casing.

DETAILED DESCRIPTION OF THE PREFERRED EMBODIMENTS

Figure 1:
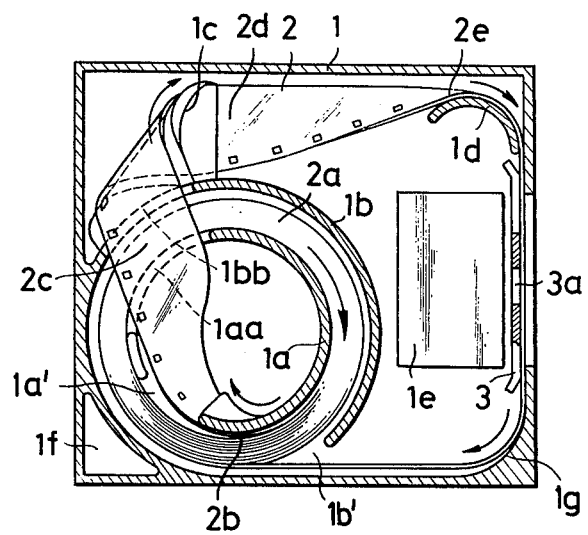
FIG. 1 is a plan view with the cover being broken away for showing the internal construction of the first embodiment of the cassette according to the present invention.

FIG. 1 shows the first embodiment of the cassette of the present invention in which an endless type 16mm cinefilm 2 having perforations along one side edge thereof is housed. The cassette comprises a casing 1 made of a synthetic resin, for example, and moulded in the generally flat rectangular form having four side walls connecting the bottom wall of the casing 1 to the upper wall or cover, the cover being omitted in FIG. 1 for the showing of the internal construction of the cassette.

The casing 1 has an annular inner guide ring 1a integrally secured, for example, to the bottom wall and an annular outer guide ring 1b also secured, for example, to the bottom wall and arranged substantially concentrically around the inner guide ring 1a with a distance held therebetween.

The inner guide ring 1a is formed with an outlet cut-out portion 1a', while the outer guide ring 1b is formed with an inlet cut-out portion 1b' as shown in FIG. 1, the purpose of these cut-out portions 1a', 1b' being described later.

The casing 1 is provided with an opening serving as a film gate at one of the side walls as shown, and a pressure plate 3 having an aperture 3a is arranged at the inside of the film gate with the aperture 3a in alignment with the film gate and resiliently urged against the film gate by a spring (not shown) for passing therebetween a portion of the film across the film gate for the projection or the exposure of the film passing across the film gate in the conventional manner.

In order to provide illumination light for the projection of the film, a hollow space 1e is provided in the casing extending from the bottom wall to the upper wall or cover of the casing 1. When the cassette is loaded in a projector for use therewith, a light source or a reflecting mirror of the projector is placed in the hollow space 1e so that the illumination light is transmitted through the aperture 3a of the pressure plate 3 and the film 2 sandwiched between the pressure plate 3 and the film gate of the casing 1 from the light source or the reflecting mirror which receives the illumination light from the light source provided in the projector thereby permitting the image born in the film to be projected onto a screen through a projecting lens (not shown) in the projector.

When the cassette is used for the exposure of the film therein by a cinecamera for use therewith, the hollow space 1e is dispensed with together with the aperture 3a formed in the pressure plate 3.

In order to properly effect the projection or the exposure of the film 2, the projector or the cinecamera is provided with the conventional intermittent feeding mechanism for the film 2 cooperating with the perforations in the film 2.

The film 2 is coiled to form windings thereof and the windings of the film 2 are arranged around in the inner guide ring 1a and within the outer guide ring 1b.

During the operation of the cassette in a projector or a cinecamera, a terminal portion 2b of the innermost winding of the film 2 is fed out of the outlet cut-out portion 1a' inwardly of the inner guide ring 1a while the windings of the film 2 are rotated in the clockwise direction as indicated by the arrow and advanced through a guide member 1d to the film gate of the casing 1. After passing across the film gate, the film 2 is advanced through a guide member 1g and received in the inlet cut-out portion 1b' and merges into the outermost winding of the film 2 held in the outer guide ring 1b, so that the operation of the cassette may be continued endlessly by virtue of the endless type film 2.

In accordance with one of the characteristic features of the present invention, the guide means for guiding the movement of the portion 2c of the film 2 fed out of the outlet cut-out portion 1a' of the inner guide ring 1a comprises an arcuate guide member 1c secured to the casing 1 outside of the outer guide ring 1b obliquely with respect to the direction of movement of the portion 2c of the film 2 fed out of the outlet guide ring 1b at a position remote from the outlet cut-out portion 1a', so that the portion 2c of the film 2 is twisted by 90° in the anticlockwise direction while it is advanced from the outlet cut-out portion 1a' over the outer arcuate guide surface of the guide member 1c, thereby permitting the plane of the portion 2c of the film 2 to be positioned closely adjacent to the windings of the film 2 during the movement of the film 2 across the shallow recesses 1aa and 1bb formed in the inner and outer guide rings 1a, 1b, respectively. After having been guided over the outer arcuate guide surface of the guide member 1c, the portion 2d of the film 2 is further twisted by 180° in the anticlockwise direction while the direction of movement of the portion 2d of the film 2 is changed through a right angle so as to be directed to the guide member 1d with the plane of the portion 2d of the film 2 held in the plane of the lower axial end surface of the windings of the film. The portion 2d of the film 2 is further twisted by 90° in the anticlockwise direction until it reaches the portion 2e of the film 2 guided by the guide member 1d. Thus, the resultant twisting of the film 2 during the travel of the portion of the film 2 from the outlet cut-out portion 1a' to the inlet cut-out portion 1b' is 90° + 180° + 90° = 360°.

Thus, the endless film 2 is properly operated in the endless manner the film being caused to execute a 360° twist between leaving the innermost winding of the film coil and entering the film gate by way of guide member 1d.

Figure 2:
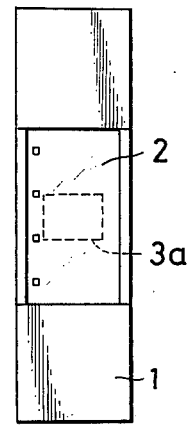
FIG. 2 is a side view of FIG. 1.

As described above, since the portion 2c of the film 2 is moved closely adjacent to the windings of the film 2, the internal dimension of the casing in the axial direction of the windings of the film 2 can be made substantially equal to the width plus the thickness of the film 2, thereby permitting the thickness of the cassette to be made to the minimum as shown in FIG. 2.

In order to facilitate the smooth guiding of the film through the outlet cut-out portion 1a' of the inner guide ring 1a, one edge of the cut-out portion 1a' is preferably formed in the arucate shape as shown in FIG. 1.

The hollow portion 1f in the casing is for reducing the material for the molding of the casing and for reducing the manufacturing cost.

Figure 3:
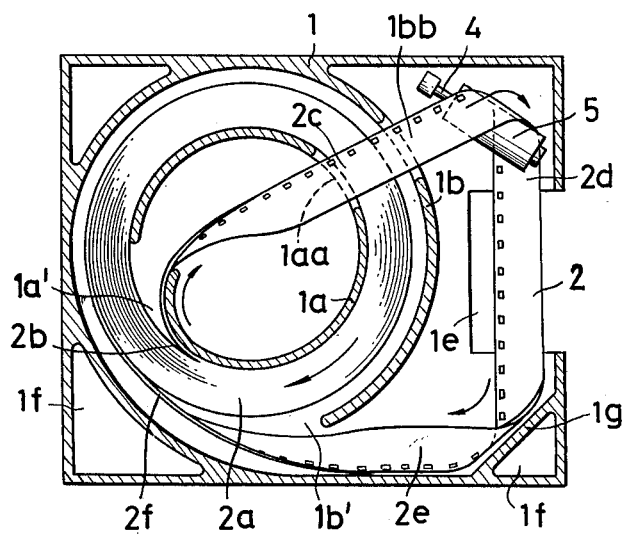
FIG. 3 is a plan view similar to FIG. 1 but showing the second embodiment of the present invention.

FIG. 3 shows the second embodiment of the cassette of the present invention.

In this case, the film gate is formed in the bottom wall of the casing 1, so that the film 2 is advanced across the film gate in parallel to the bottom wall.

The guide means for guiding the portion 2c of the film 2 fed out of the outlet cut-out portion 1a' of the inner guide ring 1a is in the form of a rotatable guide roller 5 rotatably supported by a shaft 4 which is in turn supported by the casing 1.

In like manner as in FIG. 1, the guide roller 5 is located obliquely with respect to the direction of movement of the portion 2c of the film 2 with the axis thereof in parallel to the bottom wall of the casing 1.

Therefore, the portion 2d of the film 2 having been guided over the guide roller is twisted by 180° in the anticlockwise direction while the direction of movement of the portion 2d of the film 2 is changed so as to be advanced across the film gate.

The portion of the film 2d having been passed across the film gate 1e is then advanced toward the guide member 1g where a first edge of the film (illustrated to be non-perforated) contacts the guide member 1g before a second edge of the film (illustrated to be perforated) contacts the guide member 1g. By this sequential rather than simultaneous contact between the edges of the film and the guide member 1g, the film is guided by the guide member 1g so as to be twisted by 180° in the clockwise direction while the direction of movement of the portion 2e of the film 2 thus guided by the guide member 1g is changed so as to be directed to the inlet cut-out portion 1b' of the outer guide ring 1b.

The portion 2e of the film 2 is further twisted by 90 in the clockwise direction during the travel from the guide member 1g to the inlet cut-out portion 1b'.

Therefore, the resultant twisting of the film 2 during the travel from the outlet cut-out portion 1a' to the inlet cutout portion 1b' is zero, because the twisting of the film 2 by 90° + 180° in the anticlockwise direction during the travel from the outlet cut-out portion 1a' to the film gate cancels the 90° + 180° twisting of the film in the clockwise direction during the travel from the film gate to the inlet cut-out portion 1b', thereby insuring the proper operation of the endless film 2.

In like manner as in FIG. 1, since the portion 2c of the film 2 passes across the shallow recesses 1aa, 1bb so as to be moved closely adjacent the windings of the film 2, the thickness of the cassette can be made to the minimum.

It is apparent that the guide member 1c in FIG. 1 can be replaced by the guide roller 5 in FIG. 3 and vice versa.

I claim:
1. A cassette for an endless type film comprising:
a rectangular casing for housing therein said film coiled to form windings, said casing comprising a bottom wall, four side walls connected to the bottom wall, and a top wall, said top and bottom walls being separated by a distance substantially equal to the sum of the width of the film plus the thickness of the film, the casing further comprising
a film gate formed in a side wall of said casing oriented for the projection or the exposure of the portion of said film fed out of said windings and guided to pass across said film gate,
an annular inner guide ring secured to said casing for positioning and guiding the innermost winding of said film located around said inner guide ring, the inner guide ring having an outlet cut-out portion for feeding therethrough the terminal portion of the innermost winding of said film inwardly of said inner guide ring,
an annular outer guide ring secured to said casing and arranged around said inner guide ring substantially concentrically therewith and spaced a distance therefrom so that the windings of said film located around said inner guide ring are held within said outer guide ring, said outer guide ring having an inlet cut-out portion for receiving therethrough the foremost portion of said film which has been fed across said film gate into the interior of said outer guide ring to merge into the outermost winding of said film, said inner guide ring and said outer guide ring each having a shallow depression remote from said outlet cut-out portion of said inner guide ring for twisting that portion of the film fed out of said outlet cut-out portion by 90° as the film is advanced across said inner and outer guide rings,
a guide means for guiding said film fed out of said outlet cut-out portion of said inner guide ring across said inner and outer guide rings, said guide means being supported at a portion of said casing exteriorly of said outer guide ring adjacent to the position at which said portion of said film fed out of said inner guide ring moves across said inner and outer guide rings, the outer surface of said guide means being oriented obliquely with respect to the direction of movement of said film moving across said inner and outer guide rings, for twisting the portion of said film guided over said outer surface of said guide means by 180° in the same direction as the said twisting of 90°, the direction of movement of said portion of said film guided over said outer surface of said guide means being turned substantially at right angles, and
a further guide member for guiding said film from said guide means to said film gate and twisting said film by 90° in the same direction as the twisting of 180° effected by said guide means thereby causing said film to execute a 360° twist between being fed out of said inner guide ring and being moved across said film gate, then to be advanced to said inlet cut-out portion of said outer guide ring so as to merge into the outermost winding of said film.

2. A cassette as claimed in claim 1, wherein said guide means comprises a roller rotatably supported in said casing adjacent said shallow depression in said outer guide ring.

3. A cassette as claimed in claim 1, wherein said guide means comprises an arcuate surface secured to casing outside the outer guide ring, adjacent said shallow depression of said outside guide ring.

4. A cassette as claimed in claim 1, further comprising a pressure plate arranged at the inside of and resiliently urged against said film gate, said pressure plate having an aperture in alignment with said film gate.

5. A cassette as claimed in claim 4, further comprising a hollow space in said casing between said casing and said film gate for receiving means for transmitting illuminating light through said aperture, film and film gate.

* * * * *

UNITED STATES PATENT OFFICE
CERTIFICATE OF CORRECTION

Patent No. 3,966,134         Dated June 29, 1976

Inventor(s) Yasuhisa Matsuda

It is certified that error appears in the above-identified patent and that said Letters Patent are hereby corrected as shown below:

On the Title Page, Item [75] "Mitaka" should read --- Tokyo ---.

Signed and Sealed this

Thirty-first Day of August 1976

Attest:

RUTH C. MASON
*Attesting Officer*

C. MARSHALL DANN
*Commissioner of Patents and Trademarks*